United States Patent
Kaneda

(10) Patent No.: US 7,783,207 B2
(45) Date of Patent: Aug. 24, 2010

(54) AUTOMATIC THRESHOLD VOLTAGE ADJUSTMENT CIRCUIT FOR DENSE WAVELENGTH DIVISION MULTIPLEXING OR PACKET TRANSPORT SYSTEM AND METHOD OF OPERATING THE SAME

(75) Inventor: Noriaki Kaneda, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 658 days.

(21) Appl. No.: 11/769,177

(22) Filed: Jun. 27, 2007

(65) Prior Publication Data

US 2009/0003845 A1    Jan. 1, 2009

(51) Int. Cl.
*H04B 10/06* (2006.01)

(52) U.S. Cl. ............... 398/202; 398/208; 398/209; 398/210; 398/212; 398/213; 398/136; 398/158; 398/159; 398/160

(58) Field of Classification Search ......... 398/135–139, 398/158, 159, 160, 164, 202–214
See application file for complete search history.

(56) References Cited

U.S. PATENT DOCUMENTS

| | | | | |
|---|---|---|---|---|
| 4,459,540 A | * | 7/1984 | Hayashi | 323/314 |
| 4,481,676 A | * | 11/1984 | Eumurian et al. | 398/136 |
| 4,574,249 A | * | 3/1986 | Williams | 330/59 |
| 4,605,904 A | * | 8/1986 | Hajj-Chehade | 329/325 |
| 2006/0081779 A1 | * | 4/2006 | Yeo et al. | 250/338.1 |
| 2006/0195883 A1 | * | 8/2006 | Proctor et al. | 725/127 |

OTHER PUBLICATIONS

A.K. Srivastava, et al., "EDFA Transient Response to Channel Loss in WDM Transmission System" IEEE Photonics Technology Letters, vol. 9, No. 3, Mar. 1997, pp. 386-388.
Miroslav Karasek, et al., "Channel Addition/Removal Response in Cascades of Strongly Inverted Erbium-Doped Fiber Amplifiers" Journal of Lightwave Technology, vol. 16, No. 12, Dec. 1998, pp. 2311-2317.
Martin C. Fischer, et al., "FEC Performance Under Optical Power Transient Conditions" IEEE Photonics Technology Letters, vol. 15, No. 11, Nov. 2003, pp. 1654-1656.
N. Kaneda, et al., "Polarization Mode Dispersion Tolerance of an Adaptive Threshold Receiver" 2002 IEEE LEOS Summer Topicals, Mont Tremblant, Quebec, Canada, pp. 39-40, Jul. 2002.

* cited by examiner

*Primary Examiner*—Li Liu
(74) *Attorney, Agent, or Firm*—Hitt Gaines, PC

(57) ABSTRACT

An automatic threshold voltage adjustment circuit, a method of automatically adjusting threshold voltage and an optical receiver for an optical communication system. In one embodiment, the circuit includes: (1) an amplitude detector configured to detect an amplitude of a received optical signal, (2) a variable resistor coupled to the amplitude detector and including a field-effect transistor configured to operate in a triad mode to provide a resistance that varies substantially linearly based on the amplitude and (3) an operational amplifier coupled to the variable resistor and configured to apply a variable gain based on the resistance to an input threshold voltage to yield an adapted threshold voltage.

20 Claims, 6 Drawing Sheets

AUTOMATIC THRESHOLD VOLTAGE ADJUSTMENT CIRCUIT FOR DENSE WAVELENGTH DIVISION MULTIPLEXING OR PACKET TRANSPORT SYSTEM AND METHOD OF OPERATING THE SAME

TECHNICAL FIELD OF THE INVENTION

The invention is directed, in general, to optical data communication systems and, more particularly, to an automatic threshold voltage adjustment circuit for a dense wavelength division multiplexing (DWDM) or packet transport system and a method of operating the same to effect optical communication.

BACKGROUND OF THE INVENTION

DWDM optical communication systems have enabled significant progress in total capacity, flexibility and efficiency per single optical fiber. DWDM systems, which find use in long-haul or metro network applications, often employ multiple optical amplifiers (OAs), such as erbium-doped fiber amplifiers (EDFAs) or Raman amplifiers, in series to compensate for optical power loss in the fiber path and other optical components of the system. The OAs are normally operated under gain-saturation. When gain-saturated amplifiers are cascaded, however, a large spike or drops in output power occur when amplifiers experience sudden drops or increases in input power caused, for instance, when DWDM channels are dropped or added. The typical result is bit errors in surviving channels and can be significant for a large number of cascaded amplifiers. Srivastava, et al., "EDFA Transient Response to Channel Loss in WDM Transmission," IEEE Photonics Technology Letters, vol. 9, no. 3, pp. 386-388, November 1997 and Karasek, et al., "Channel Addition/Removal Response in Cascades of Strongly Inverted Erbium-Doped Fiber Amplifiers," IEEE Journal of Lightwave Technologies, vol. 11, no. 9, pp. 2311-2317, December 1998, recognize this problem.

Various optical and electrical techniques have been proposed in an effort to address this problem. For example, Srivastava, et al., and Karasek, et al., are directed to optical techniques and respectively propose a fast pump control in a two-stage EDFA and a strongly inverted EDFA with high pump power. These optical techniques are effective, but because they require new OAs, they are feasible only for new, so-called "green-field" optical communication systems. They are cost-prohibitive for retrofitting so-called "brown-field" systems that have installed legacy EDFAs.

Fischer, et al., "FEC performance under optical power transient conditions," IEEE Photonics Technology Letters, vol. 15, no. 11, pp. 1654-1656, November 2003, proposes an electrical technique reported in public that uses forward error correction (FEC) to compensate for short burst errors. With this technique, it is possible to correct very short errors of perhaps a few hundred bits, but it is not suitable for practical applications, in which transients often lasts for at least thousands of bits. Kaneda, et al., "Polarization Mode Dispersion Tolerance of an Adaptive Threshold Receiver", 2002 IEEE LEOS Summer Topicals, Mont Tremblant, Quebec, Canada, pp. 39-40, July 2002 proposes tracking the threshold voltage of a receiver's slicer circuit using FEC feedback. Unfortunately, this technique suffers a relatively slow response time resulting from the digital frame length and feedback scheme.

What is needed in the art is a better technique to compensate for output power transients. The technique should be faster and able to accommodate a wider dynamic range than those carried out in today's optical receivers. What is particularly needed in the art is an electrical technique to compensate for output power transients that is suitable for DWDM optical communication systems.

SUMMARY OF THE INVENTION

To address the above-discussed deficiencies of the prior art, the invention provides, in one aspect, an automatic threshold voltage adjustment circuit. In one embodiment, the circuit includes: (1) an amplitude detector configured to detect an amplitude of a received optical signal, (2) a variable resistor coupled to the amplitude detector and including a field-effect transistor (FET) configured to operate in a triad mode to provide a resistance that varies substantially linearly based on the amplitude and (3) an operational amplifier (op-amp) coupled to the variable resistor and configured to apply a variable gain based on the resistance to an input threshold voltage to yield an adapted threshold voltage.

In another aspect, the invention provides a method of automatically adjusting threshold voltage. In one embodiment, the method includes: (1) detecting an amplitude of a received optical signal with an amplitude detector, (2) providing a resistance that varies substantially linearly based on the amplitude with a variable resistor coupled to the amplitude detector and including a FET configured to operate in a triad mode and (3) applying a variable gain based on the resistance to an input threshold voltage to yield an adapted threshold voltage with an op-amp coupled to the variable resistor.

In yet another aspect, the invention provides an optical receiver for an optical communication system. In one embodiment, the receiver includes: (1) a receive chain configured to receive an optical signal and derive an electrical signal representing digital data therefrom based on an adapted threshold voltage and (2) an automatic threshold voltage adjustment circuit. In one embodiment, the automatic threshold voltage adjustment circuit includes: (2a) an amplitude detector configured to detect an amplitude of a received optical signal, (2b) a variable resistor coupled to the amplitude detector and including a FET configured to operate in a triad mode to provide a resistance that varies substantially linearly based on the amplitude and (2c) an op-amp coupled to the variable resistor and configured to apply a variable gain based on the resistance to an input threshold voltage to yield the adapted threshold voltage.

The foregoing has outlined aspects and embodiments of the invention so that those skilled in the pertinent art may better understand the detailed description that follows. Additional and alternative features will be described hereinafter that form the subject of the claims of the invention. Those skilled in the pertinent art should appreciate that they can readily use the disclosed conception and specific embodiment as a basis for designing or modifying other structures for carrying out the same purposes. Those skilled in the pertinent art should also realize that such equivalent constructions lie within the scope of the invention.

BRIEF DESCRIPTION OF THE DRAWINGS

For a more complete understanding, reference is now made to the following descriptions taken in conjunction with the accompanying drawings, in which.

DETAILED DESCRIPTION

Figure 1:
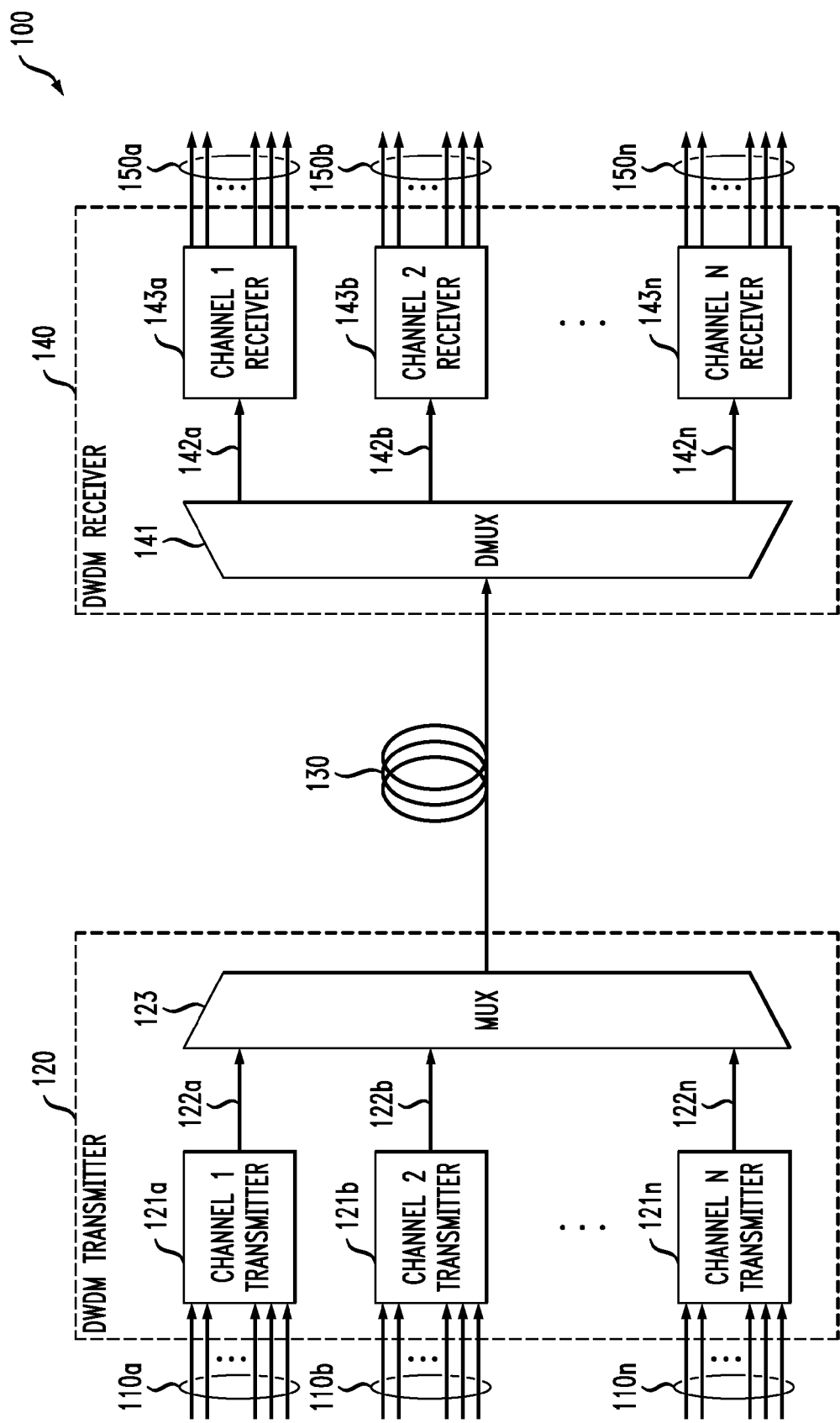
FIG. 1 illustrates a high-level block diagram of a multi-channel (e.g., DWDM) optical packet transport system that may form an environment within which an automatic threshold voltage adjustment circuit constructed according to the principles of the invention can operate.

FIG. 1 illustrates a high-level block diagram of a multichannel (e.g., DWDM) optical packet transport system, generally designated 100, that may form an environment within which an automatic threshold voltage adjustment circuit constructed according to the principles of the invention can operate. Other environments suitable for the invention include (non-DWDM) WDM systems, single-channel (non-WDM) systems and optical communication systems that do not transport data as packets. (WDM is regarded as DWDM when wavelength spacing is 100 GHz or less.) Those skilled in the pertinent art will see a variety of applications for the automatic threshold voltage adjustment circuit constructed according to the principles of the invention. All such applications fall within the broad scope of the invention.

The system 100 includes a DWDM transmitter 120, a DWDM receiver 140 and an optical fiber 130 coupling the DWDM transmitter 120 and the DWDM receiver 140. The system 100 receives digital data in the form of electrical signals carried on a plurality of input data lines 110a, 110b, 110n. The input data lines 110a, 110b, 110n may be of any number and grouped in any manner. FIG. 1 shows the input data lines 110a, 110b, 110n being grouped such that they correspond to channel-specific optical transmitters in the DWDM transmitter 120. More specifically, the input data lines 110a lead to a channel 1 transmitter 121a, while the input data lines 110bb lead to a channel 2 transmitter 121b, and the input data lines 110n lead to a channel N transmitter 121n. The DWDM transmitter 120 shows only three channel-specific optical transmitters 121a, 121b, 121n, but all numbers of channel-specific optical transmitters fall within the scope of the invention.

The channel-specific optical transmitters 121a, 121b, 121n convert the electrical signals carried on the input data lines 110a, 110b, 110n into streams of optical pulses and transmit those streams of optical pulses on optical fibers or waveguides 122a, 122b, 122n, respectively. The streams of optical pulses borne on the optical fibers or waveguides 122a, 122b, 122n are assumed to be of different wavelength. An optical multiplexer 123 receives the streams of optical pulses transmitted via the optical fibers or waveguides 122a, 122b, 122n and combines them in a known manner to yield a DWDM optical signal (including multiple streams of optical pulses) that is transmitted along the optical fiber 130 to the DWDM receiver. Amplifiers (not shown), which may be EDFAs, may be located along the length of the optical fiber 130 to preserve the power of the DWDM optical signal.

An optical demultiplexer 141 splits the DWDM signal into separate streams of optical pulses based on wavelength. The separate streams of optical pulses exit the optical demultiplexer 141 on optical fibers or waveguides 142a, 142b, 142n by which they are carried to channel-specific optical receivers. More specifically, the stream of optical pulses carried on the optical fiber or waveguide 142a is provided to a channel 1 receiver 143a, while the stream of optical pulses carried on the optical fiber or waveguide 142b is provided to a channel 2 receiver 143b, and the stream of optical pulses carried on the optical fiber or waveguide 142n is provided to a channel N receiver 143n. The DWDM receiver 140 shows only three channel-specific optical receivers 143a, 143b, 143n, but all numbers of channel-specific optical receivers fall within the scope of the invention. Typically, however, the number of channel-specific receivers in the DWDM receiver 140 corresponds to the number of channel-specific transmitters in the DWDM transmitter 120.

The channel-specific optical receivers 143a, 143b, 143n convert the streams of optical pulses into digital data in the form of electrical signals and transmit those electrical signals on output data lines 150a, 150b, 150n. If the system 100 is operating properly, the digital data carried on the output data lines 150a, 150b, 150n should correspond to the digital data provided on the input data lines 110a, 110b, 110n.

As described above, fluctuating optical transmission characteristics such as XPM, channel crosstalk resulting from FWM and received power variations between channels and consequent SNR dispersion caused by SRS encountered in, for example, the optical fiber 130, can change the power of received streams of optical pulses and thus the electrical signals. The DWDM receiver 140 should adapt to these characteristics such that error rates are reduced and data rates are increased.

Figure 2:
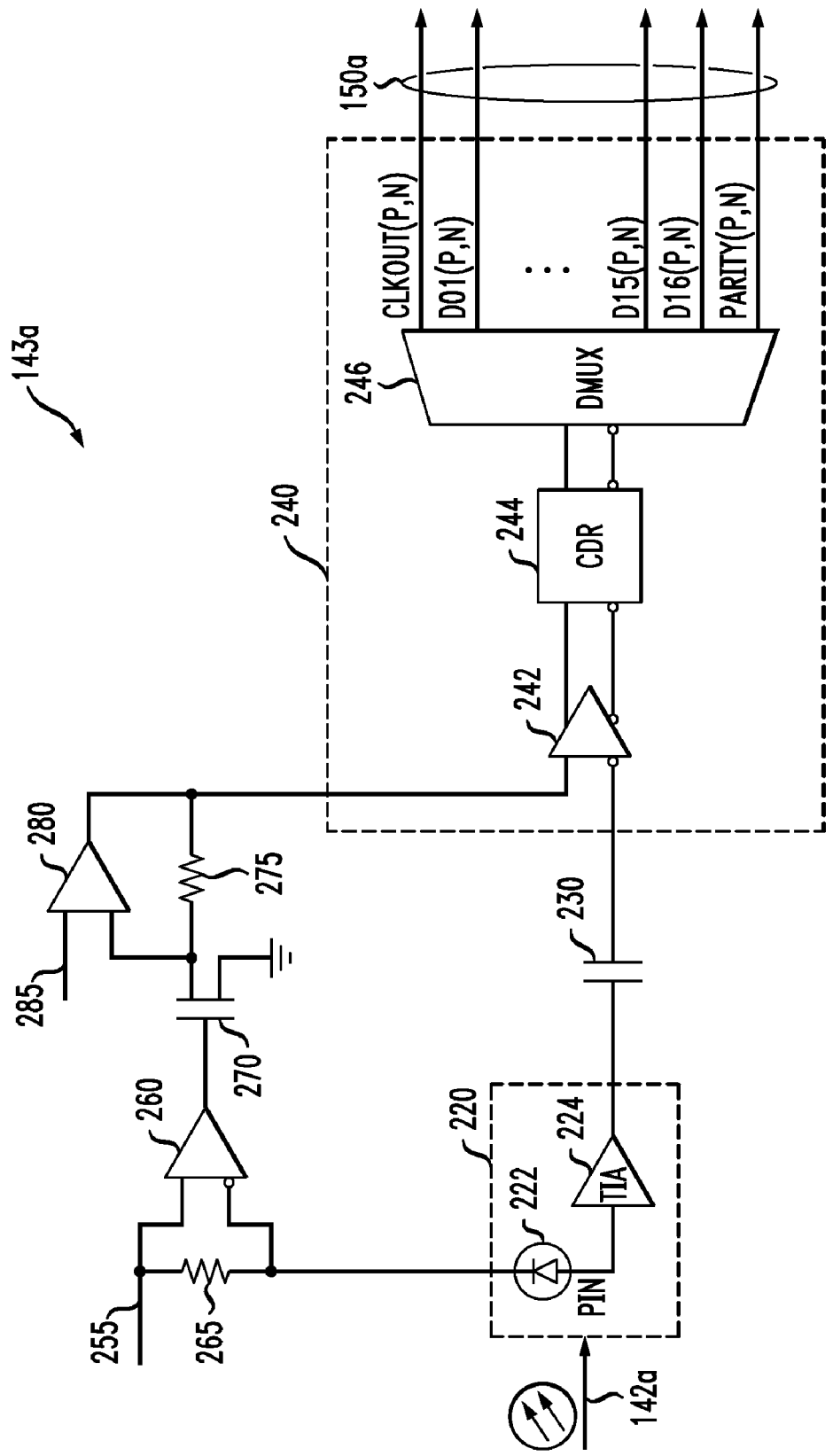
FIG. 2 illustrates a block diagram of one embodiment of an optical receiver suitable for use in the multichannel optical packet transport system of FIG. 1, the optical receiver including one embodiment of an automatic threshold voltage adjustment circuit constructed according to the principles of the invention.

FIG. 2 illustrates a block diagram of one embodiment of an optical receiver, e.g., the channel 1 receiver 143a of FIG. 1, suitable for use in the multichannel optical packet transport system of FIG. 1. The optical receiver 143a includes one embodiment of an automatic threshold voltage adjustment circuit constructed according to the principles of the invention.

The optical receiver 143 includes a receive chain configured to receive an optical signal (taking the form of a stream of optical pulses in the illustrated embodiment) on the optical fiber or waveguide 142a and derive an electrical signal representing digital data therefrom based on an adapted threshold voltage. The receive chain includes an analog portion 220, a filter 230 and a digital portion 240. The analog portion includes a photodiode 222 configured to convert the optical signal into an analog electrical signal containing current variations and a linear transimpedance amplifier (TIA) 224 configured to convert the current variations into voltage variations. The filter 230 blocks frequencies below a cutoff point (e.g., DC offsets) from entering the digital portion 240 of the receive chain.

The digital portion 240 includes a limiting op-amp 242 configured to convert the analog electrical signal into digital form based on an adapted threshold voltage. The analog electrical signal is provided to the limiting op-amp 242 at an inverted input as shown. The adapted threshold voltage is provided to the limiting op-amp 242 at a noninverted input as shown. The limiting op-amp 242 generates a logical one at a noninverted output thereof and a logical zero at an inverted output thereof when the voltage of the analog electrical signal exceeds the adapted threshold voltage and generates a logical zero at the noninverted output and a logical one at the inverted output when the voltage of the adapted threshold voltage exceeds the analog electrical signal.

A clock and data recovery circuit (CDR) 244 processes the resulting ones and zeroes to recover a clock signal embedded in the digital data and then use the recovered clock signal in turn to recover the digital data. Those skilled in the pertinent art understand how CDR circuits are constructed and operate. Finally, an electrical demultiplexer 246 demultiplexes the digital data into a clock line, CLKOUT(P,N), parallel data lines D01(P,N) . . . D16(P,N) (16 of which being in the illustrated embodiment) and, in the illustrated embodiment, a parity line PARITY(P,N). The clock line, CLKOUT(P,N), parallel data lines D01(P,N) . . . D16(P,N) and a parity line PARITY(P,N) collectively form the output data lines 150a as shown.

In general terms, the illustrated embodiment of the automatic threshold voltage adjustment circuit uses an analog circuit to detect the amplitude of the received optical signal and reflect that amplitude in a variable resistor built around a FET, which may be a junction FET (JFET), operating in triad mode. The variable resistor is designed such that it achieves substantially linear (within 5% of linear) characteristics over the voltage range of interest. The illustrated embodiment of the automatic threshold voltage adjustment circuit then uses the variable resistor to maintain the gain of an op-amp at an appropriate level such that an input threshold voltage is amplified to yield an appropriate adapted threshold voltage.

The illustrated embodiment of the automatic threshold voltage adjustment circuit makes use of the photodiode 222 to detect the amplitude of the received optical signal, but could use a photodetector of another kind or a peak level detector instead. The illustrated embodiment of the automatic threshold voltage adjustment circuit employs a photodiode bias signal provided at an input 255, an op-amp 260 and a fixed-value resistor 265 to provide a voltage proportional to the optical amplitude. The illustrated embodiment of the automatic threshold voltage adjustment circuit employs the JFET 270 and a fixed-value resistor 275 to vary and maintain the gain of the op-amp 280 at the appropriate level based ultimately on the amplitude of the received optical signal. The input threshold voltage, which is provided at an input 285, is thus amplified at the appropriate gain to yield the adapted threshold voltage, which is then provided to the limiting op-amp 242 at a noninverted input as shown.

In one embodiment, the variable resistor created by the JFET 270 ranges from about 0 ohm to about 90 k ohms, the capacitor 230 can range from about 0.01 uF to about 0.1 uF, the fixed resistor 275 is an equivalent resistor of about 14 k ohm, and the input threshold voltage varies from 0.5 volts to 2.0 volts.

Figure 3:
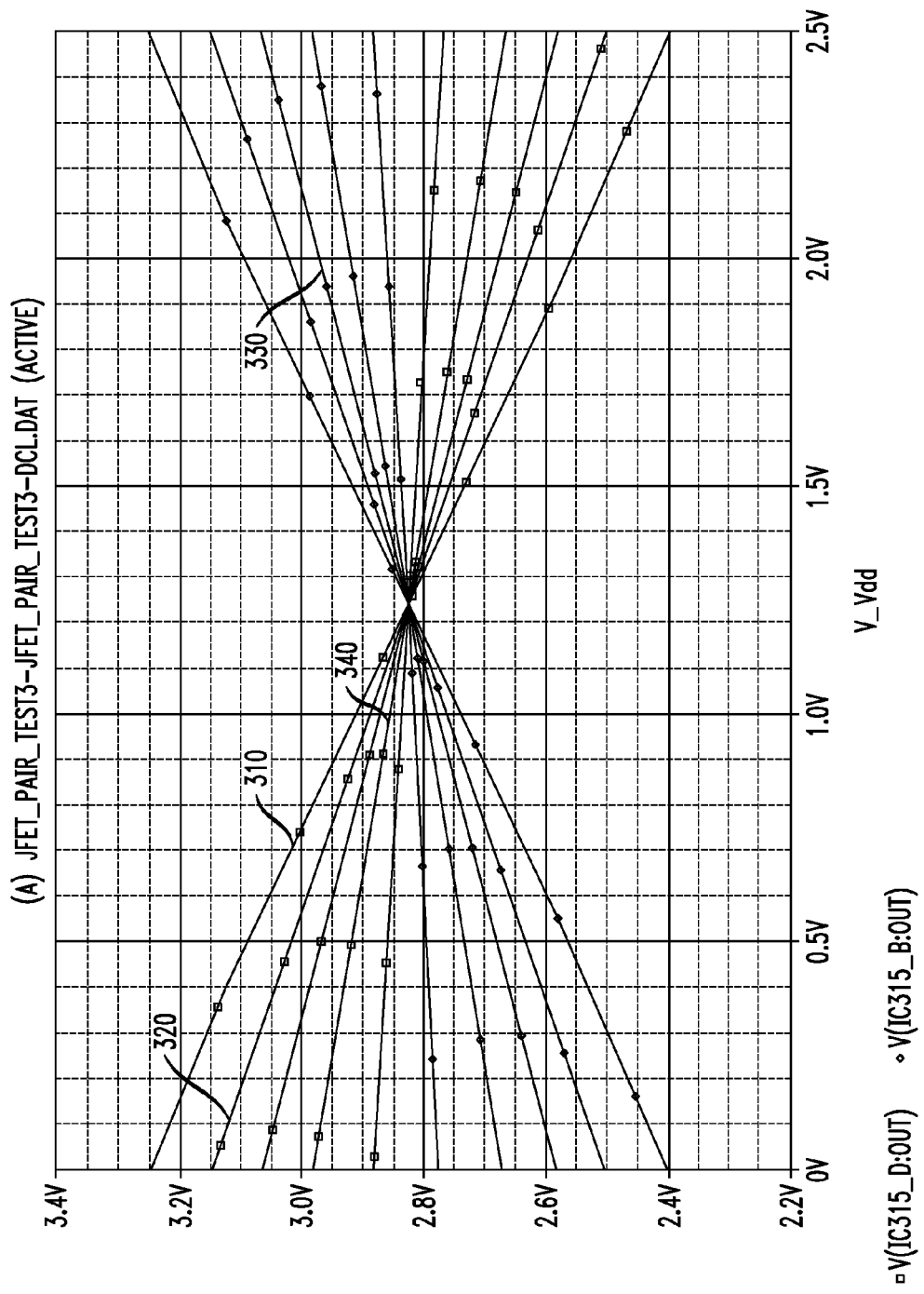
FIG. 3 illustrates a graphical representation of automatic threshold voltage adjustment as the circuit of FIG. 2 may carry out

FIG. 3 illustrates a graphical representation of automatic threshold voltage adjustment as the circuit of FIG. 2 may carry out. The input threshold voltage is approximately 1.25 volts. The adapted threshold voltage varies as a linear function of the amplitude of the received optical signal. It can be seen that, for example, the lines 310, 320, 330, 340 all pass through 1.25 volts (at a unity gain), but that the slope of each line 310, 320, 330, 340 varies as a function of the amplitude of the received optical signal. For example, the increased slope of the line 310 indicates a greater amplitude than does the lesser slope of the line 340.

Figure 4:
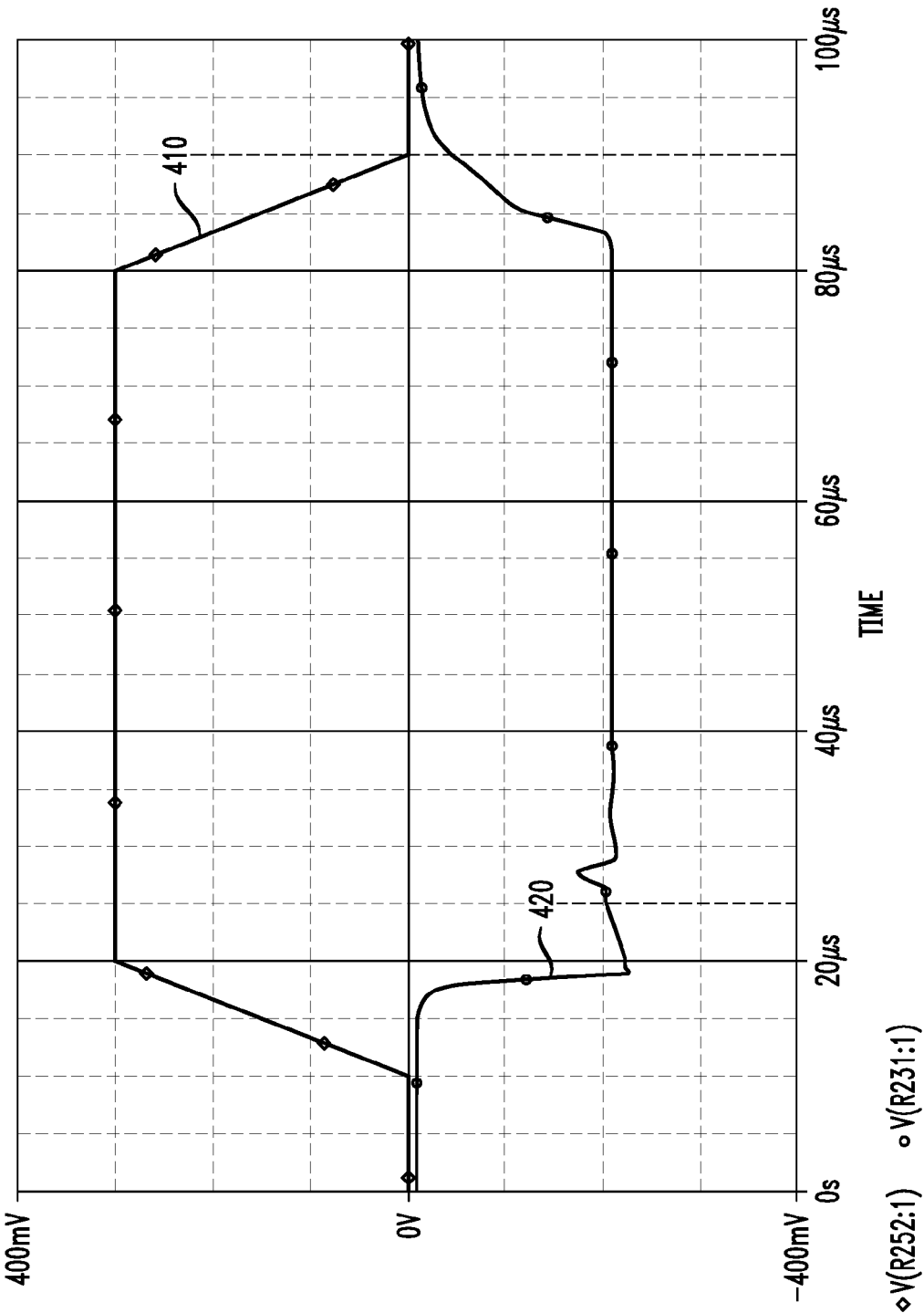
FIG. 4 illustrates a graphical representation highlighting automatic threshold voltage adjustment speeds attainable by one embodiment of the circuit of FIG. 2.

One potential advantage of the automatic threshold voltage adjustment technique disclosed herein is that the adjustment speed can be much faster than the above-described FEC feedback technique or any existing digital-based techniques cited in below link as another example. FIG. 4 illustrates a graphical representation highlighting automatic threshold voltage adjustment speeds attainable by one embodiment of the circuit of FIG. 2. An upper curve 410 represents the input, and a lower curve 420 represents the output. A 10 μs 10 dB transient results in less than a 0.5 decade increase in bit error rate (BER), which is beyond the capability of existing techniques.

Figure 5:
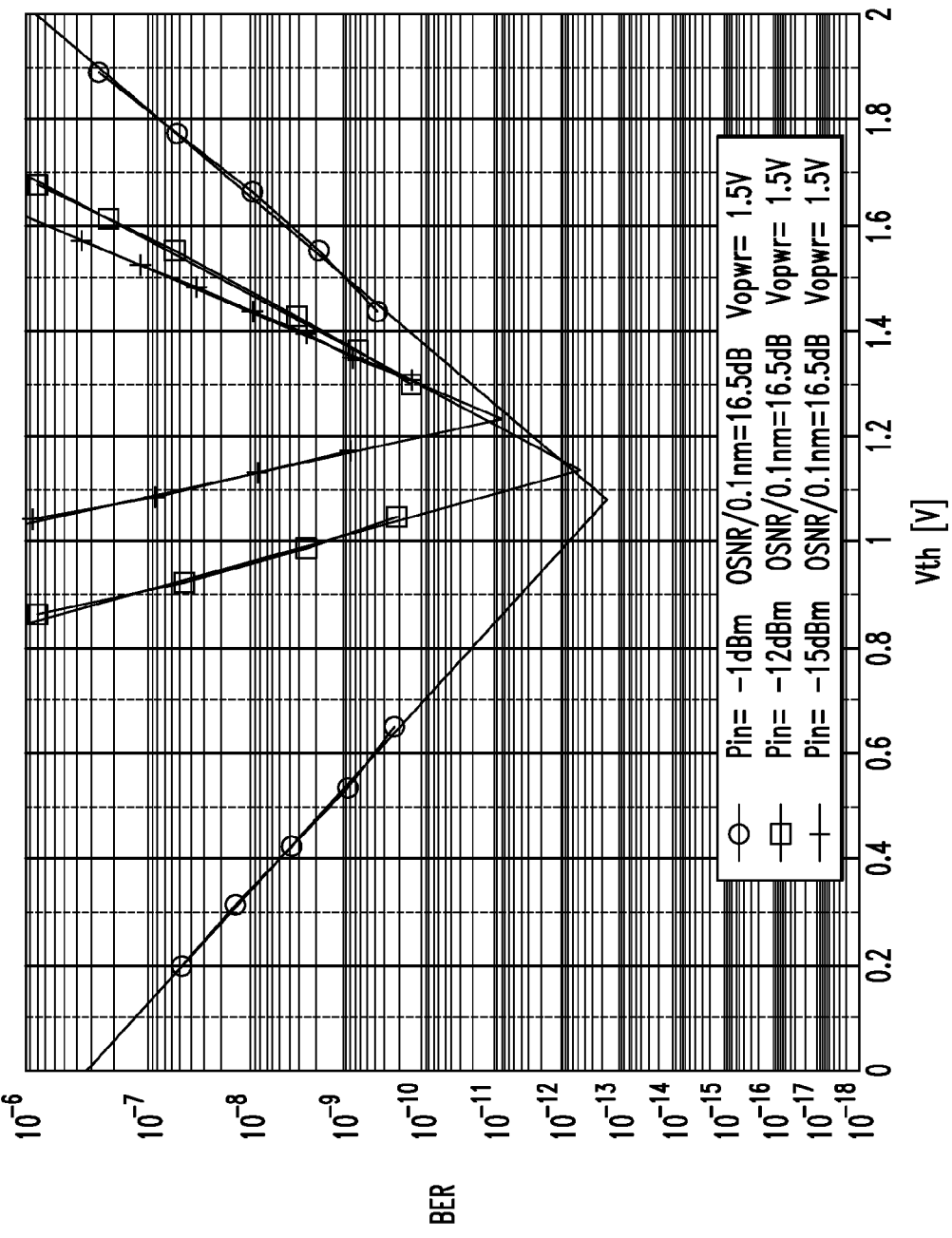
FIG. 5 illustrates a graphical representation highlighting dynamic range accommodation attainable by one embodiment of the circuit of FIG. 2.

Another potential advantage of the automatic threshold voltage adjustment technique disclosed herein is that it can accommodate a relatively high dynamic range. While automatic gain control (AGC)-based automatic power control (see, e.g., Muehlschein, "Optimize Your DWDM Signal Chain—for the Long Haul," Communication Systems Design, Vol. 9; Part 6, pp. 24-29, 2003) can cope with fast power transients, they are unable to handle a dynamic range of 10 dB or more. Certain embodiments of the circuit of FIG. 2 can accommodate at least 11 dB, and perhaps as much as 14 dB without substantially increasing BER (see FIG. 5).

Figure 6:
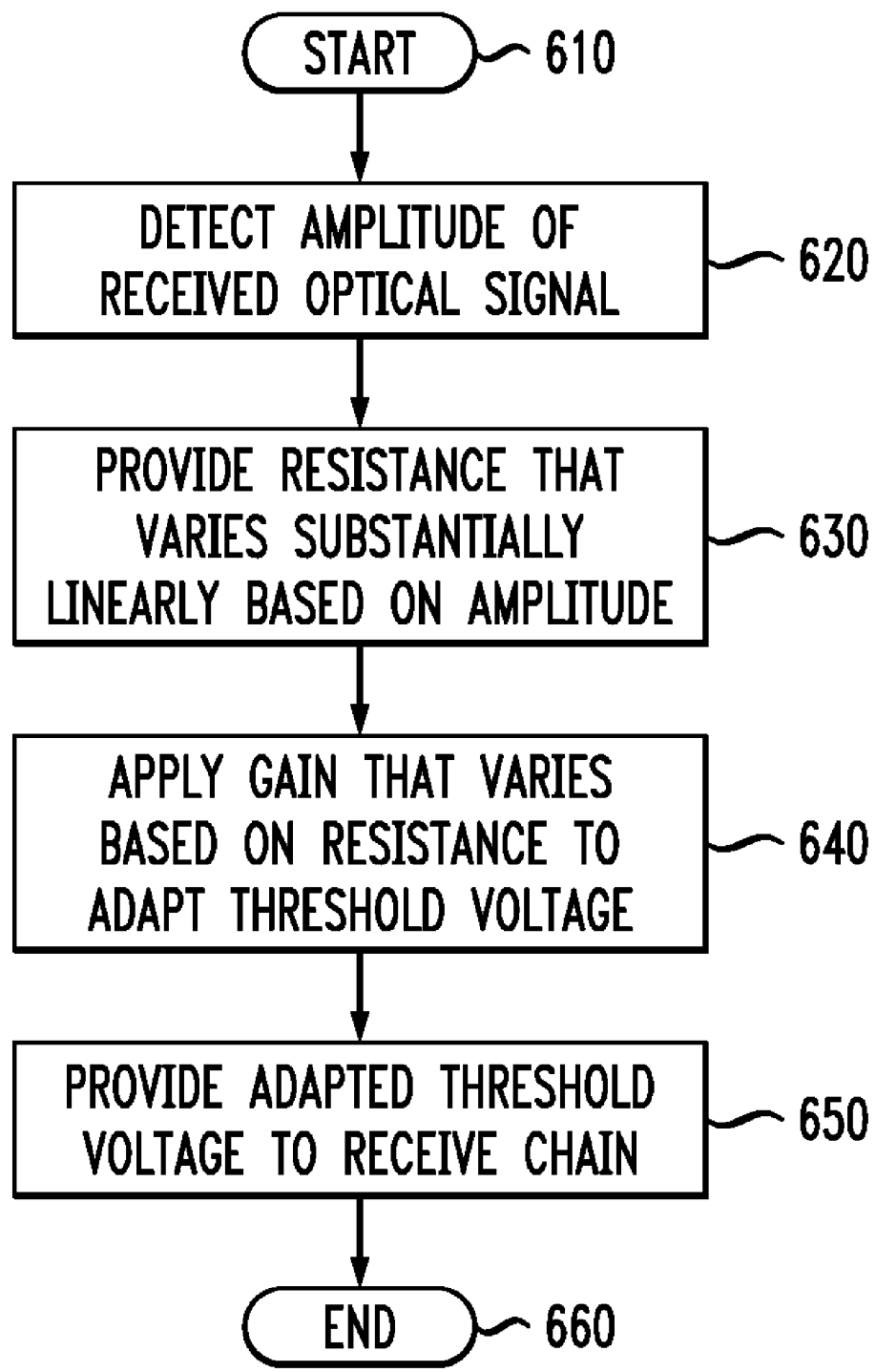
FIG. 6 illustrates a flow diagram of one embodiment of a method of automatically adjusting threshold voltage to effect optical communication carried out according to the principles of the invention.

FIG. 6 illustrates a flow diagram of one embodiment of a method of automatically adjusting threshold voltage to effect optical communication carried out according to the principles of the invention. The method begins in a start step 610, when an optical signal is received. In a step 620, the amplitude of the received optical signal is detected with an amplitude detector of some type. In a step 630, a resistance that varies substantially linearly based on the amplitude is provided with a variable resistor coupled to the amplitude detector. The variable resistor including a FET, which may be a JFET, configured to operate in a triad mode. In a step 640, a variable gain based on the resistance is applied to an input threshold voltage to yield an adapted threshold voltage with an operational amplifier coupled to the variable resistor. In a step 650, the adapted threshold voltage may then be provided to a receive chain of an optical receiver. The method ends in an end step 660.

Although certain embodiments of the invention have been described in detail, those skilled in the pertinent art should understand that they can make various changes, substitutions and alterations herein without departing from the scope of the invention.

What is claimed is:

1. An automatic threshold voltage adjustment circuit, comprising:
    an amplitude detector configured to detect an amplitude of a received optical signal;
    a variable resistor coupled to said amplitude detector and including a field-effect transistor configured to operate in a triad mode to provide a resistance that varies substantially linearly based on said amplitude; and
    an operational amplifier coupled to said variable resistor and configured to apply a variable gain based on said resistance to an input threshold voltage to yield an adapted threshold voltage.

2. The circuit as recited in claim 1 wherein said amplitude detector is selected from the group consisting of:
    a photodetector, and
    a peak level detector.

3. The circuit as recited in claim 1 wherein said field effect transistor is a junction field effect transistor.

4. The circuit as recited in claim 1 wherein said received optical signal is at a single wavelength.

5. The circuit as recited in claim 1 wherein said adapted threshold voltage is provided to a receive chain of an optical receiver.

6. The circuit as recited in claim 1 wherein said circuit forms part of an optical receiver in an optical communication system selected from the group consisting of:
    a dense wavelength division multiplexing system, and
    a packet transport system.

7. A method of automatically adjusting threshold voltage, comprising:
- detecting an amplitude of a received optical signal with an amplitude detector;
- providing a resistance that varies substantially linearly based on said amplitude with a variable resistor coupled to said amplitude detector and including a field-effect transistor configured to operate in a triad mode; and
- applying a variable gain based on said resistance to an input threshold voltage to yield an adapted threshold voltage with an operational amplifier coupled to said variable resistor.

8. The method as recited in claim 7 wherein said detecting is carried out with one of:
- a photodetector, and
- a peak level detector.

9. The method as recited in claim 7 wherein said field effect transistor is a junction field effect transistor.

10. The method as recited in claim 7 wherein said received optical signal is at a single wavelength.

11. The method as recited in claim 7 further comprising providing said adapted threshold voltage to a receive chain of an optical receiver.

12. The method as recited in claim 7 wherein said method is carried out in an optical receiver in an optical communication system selected from the group consisting of:
- a dense wavelength division multiplexing system, and
- a packet transport system.

13. An optical receiver for an optical communication system, comprising:
- a receive chain configured to receive an optical signal and derive an electrical signal representing digital data therefrom based on an adapted threshold voltage; and
- an automatic threshold voltage adjustment circuit, including:
  - an amplitude detector configured to detect an amplitude of a received optical signal,
  - a variable resistor coupled to said amplitude detector and including a field-effect transistor configured to operate in a triad mode to provide a resistance that varies substantially linearly based on said amplitude, and
  - an operational amplifier coupled to said variable resistor and configured to apply a variable gain based on said resistance to an input threshold voltage to yield said adapted threshold voltage.

14. The optical receiver as recited in claim 13 wherein said amplitude detector is selected from the group consisting of:
- a photodetector, and
- a peak level detector.

15. The optical receiver as recited in claim 13 wherein said field effect transistor is a junction field effect transistor.

16. The optical receiver as recited in claim 13 wherein said received optical signal is at a single wavelength.

17. The optical receiver as recited in claim 13 wherein said adapted threshold voltage is provided to an operational amplifier in said receive chain.

18. The optical receiver as recited in claim 13 further comprising:
- an additional plurality of said optical receivers; and
- a demultiplexer coupled to said receiver and said additional plurality of optical receivers and configured to apportion received optical signals thereamong based on wavelengths thereof.

19. The optical receiver as recited in claim 18 wherein said receiver is in a dense wavelength division multiplexing system.

20. The optical receiver as recited in claim 13 wherein said optical receiver is in a packet transport system.

* * * * *